United States Patent Office 3,357,846
Patented Dec. 12, 1967

3,357,846
GLYOXAL-POLYHYDROXY BINDER-PIGMENTED COATING
Bert Growald, Kalamazoo, Mich., assignor to Allied Paper Corporation, Kalamazoo, Mich., a corporation of Illinois
No Drawing. Filed Jan. 25, 1965, Ser. No. 427,941
10 Claims. (Cl. 106—214)

ABSTRACT OF THE DISCLOSURE

The application is directed to water-resistant pigmented coating compositions which contain polyhydroxy adhesive binders, rendered water resistant by treatment with glyoxal, and to products coated with such compositions. The application discloses the discovery that the common complex phosphates and polyphosphates used as pigment dispersants in the paper and paint arts markedly affect adversely the water resistance of a glyoxal-polyhydroxy binder-pigmented coating, and that omission of the phosphate dispersing agent does not affect the ability of the pigment to be dispersed in water. Improved water resistance of coatings containing from 0 to less than 0.1% by weight of phosphate dispersing agents is disclosed.

Specification

This invention relates to water-resistant pigmented coatings and to improved products containing such water-resistant coatings. More particularly, the invention is directed to coating compositions which contain polyhydroxy adhesive binders, rendered water resistant by treatment with glyoxal.

In the paper and paint trades, for example, pigmented formulations using an aqueous vehicle, a pigment or mixture of pigments and an adhesive binder are commonly used. Polyhydroxy adhesive binders such as starch and its derivatives, polyvinyl alcohol, and the less commonly used water soluble cellulose derivatives such as methyl cellulose, hydroxy ethyl cellulose, hydroxy propyl methyl ether of cellulose and the like, have been used with varying degrees of success. Partial water resistance has been obtained with the above materials but no simple process has hitherto been found to obtain a high degree of water resistance comparable, for example to that obtained with a cured casein-formaldehyde binder.

The adhesive binder is predominant in determining the degree of water sensitivity exhibited by the coated products. Water resistance is of utmost importance when a coated paper is subjected to printing by the lithographic process or to end-use applications requiring resistance to immersion in or exposure to water. Finger marking, smudging on handling, etc., are directly related to water sensitivity.

Starch coatings are generally considered poor in regard to water sensitivity. A similar situation exists for polyvinyl alcohol. Casein, on the other hand, is relatively easily made water resistant by the use of formaldehyde. The synthetic latices such as styrene-butadiene, the acrylics, butadiene-acrylonitrile, polyvinyl acetate, etc., are not water sensitive. Starch adhesives, however, from an economic standpoint, have an enormous advantage over the proteins and synthetic latices and it is for this reason that considerable work has been done in the past in an attempt to produce a water resistant starch binder system. Many modified starch compositions have been proposed but the problem has not adequately been solved. Examples of such modifications include the addition of aminogen-formaldehyde resins; addition of water resistant materials such as the synthetic latices; addition of emulsions of waxes and insoluble fatty acids; and addition of certain metal ions and Werner type metal complexes. All of these modifications have only met with partial success.

Polyvinyl alcohol, while an expensive material, has such a high adhesive strength towards pigments that in the relatively small quantities required, it is surpassed only by starch for economy.

A world wide shortage of casein developing due to the demand for milk and milk products as food and the resulting high price of casein, coupled with the normal high price for other satisfactory binders makes starch and polyvinyl alcohol most attractive if a high degree of water-resistance could be simply attained.

While it has been known for some time that glyoxal will react with polyhydroxy materials such as starch and polyvinyl alcohol to give a product having a certain degree of water resistance, it has been pointed out that the use of these reacted materials as binders are not as effective as formaldehyde-hardened protein in the degree of water resistance imparted to pigmented coatings. (Buttrick and Eldred "Improving the Wet Rub Resistance of Starch-Clay Paper Coatings with Glyoxal," TAPPI, vol. 45, No. 11, pp. 890–893, November, 1962).

I have found that certain materials which normally are used in pigmented coating formulations act to nullify the insolubilizing action of glyoxal on starch. In the absence of these detrimental materials, a high degree of water resistance can be imparted to pigmented coatings using a glyoxal-polyhydroxy binder. In fact, superior water resistance is obtained over that with protein hardened with formaldehyde. The effect is immediate on drying of the coating. No curing or abnormally high temperatures are required.

It has not been recognized heretofore that the common complex phosphates and polyphosphates used as pigment dispersants markedly affect the water resistance of a glyoxal-polyhydroxy binder-pigmented coating. These materials are generally added to coating grades of kaolin type clays by the manufacturer and the products are sold as "predispersed clays." In addition, coating formulators skilled in the art add such dispersants as general practice in the preparation of pigmented coatings. As little as 0.1% of tetrasodium pyrophosphate based on clay, for example, will show a noticeable decrease in the water resistance of a clay-starch-glyoxal paper coating over that containing no tetrasodium polyphosphate. Generally speaking 0.5% of a dispersant is commonly used.

The coating compositions of my invention employ, as a pigment, clay, titanium dioxide, talc, barytes or mixtures thereof, which contains from 0 to less than 0.1% by weight of phosphate dispersing agents. To a slurry of the pigment is added from 10 to 50 parts by weight, based upon 100 parts of pigment, of a binder taken from the group consisting of hydroxy ethyl starch and polyvinyl alcohol. To insolubilize the binder, glyoxal is added in an amount ranging from 2 to 10 parts by weight based upon 100 parts of binder. The ingredients are homogeneously mixed and the slurry may then be applied to paper or other base material to be coated. Upon drying, to evaporate the water, the coating takes on excellent water-resistance.

Unexpectedly the omission of the phosphate dispersing agents does not affect the ability of the pigment to be dispersed in the water. The starch or polyvinyl-alcohol binder serves not only as an adhesive but they take on the function of the dispersing agent as well in accordance with my invention.

Partially derivatized starches in which a small proportion of the —OH groups are substituted are preferred over unmodified, oxidized, hydrolysed or enzyme converted products since the substituted starches exhibit the maximum degree of water resistance. This is most probably due to the greater availability of the hydroxyl groups to react with glyoxal. When used in this specification and the appended claims, the term "substituted starch" designates a water soluble starch in which a small proportion of the —OH groups are treated to convert the starch to a partial ester or ether. Substituted starches preferred in the practice of this invention are hydroxy ethyl starch and starch acetate.

The following non-limiting examples point out the invention, and illustrate how it may be practiced:

*Example I*

| | Parts by wt. |
|---|---|
| Kaolin coating clay (not predispersed) | 100 |
| Hydroxy ethyl starch | ¹ 25 |
| Glyoxal | ¹ 1.5 |
| Water | 300 |

¹ On anhydrous basis.

The starch was prepared by cooking a 15% aqueous suspension for 15–20 minutes at 190° F. The starch was then added to the clay, glyoxal (40% solution) and the remainder of the water (produces about 42% solids) in a ball mill and milled for 1–2 hours. The resulting mixture was coated on a sheet of coating paper raw stock (25" x 38"—500 sheets) of 45 lb. weight. A total of 15 lbs. of coating was applied per above ream size. The coated product was dried at 200° F. for 2 minutes. The resulting coated surface exhibited excellent wet rub resistance when tested by Procedure RC–185 specified by the Technical Association of the Pulp and Paper Industry TAPPI Routine Control Methods, published in January 1953.

*Example II*

To the formulation of Example I was added 0.5 part by weight of tetrasodium pyrophosphate and the material coated, dried and tested in the same manner as in Example I. The coating was only considered fair for wet rub resistance. A definite redispersion of the pigment was evident in the wet rub test. This composition is not in accordance with the invention.

*Example III*

Sodium hexametaphosphate was substituted for tetrasodium pyrophosphate in the above Example II with similar results. This composition is not in accordance with the invention.

*Example IV*

The following composition was prepared in accordance with Example I, polyvinyl alcohol being substituted for starch:

| | |
|---|---|
| Kaolin coating clay (not predispersed) | 100 |
| Polyvinyl alcohol | 10 |
| Glyoxal | .6 |
| Water | 300 |

The paper prepared using this composition was equivalent to the sample of Example I in wet rub resistance.

*Example V*

Eighteen parts of a conventional alkali cut casein and 1.2 parts by weight of formaldehyde were substituted for the starch and glyoxal in Example I. The water resistance of the resulting coated product was rated only fair. However, after about ten days of aging at room temperature, the wet rub resistance of casein-bound clay coating was equivalent to that obtained for the product in Example I. This is normal for conventional casein coatings, i.e., they require time to reach their full degree of water resistance under the conditions stated above. The addition of polyphosphates to the casein coating had no influence on the wet rub resistance.

*Example VI*

| | |
|---|---|
| Kaolin coating clay (not predispersed) | 95 |
| Titanium dioxide | 5 |
| Hydroxy ethyl starch | 15 |
| Polyvinyl alcohol | 5 |
| Glyoxal | 1 |
| Water | 300 |

This composition was rendered homogeneous by ball milling and coated on paper as indicated in Example I. The wet rub resistance of the coating after drying was excellent.

What is claimed as the invention is:

I claim:

1. A coating composition comprising a water dispersion of a pigment taken from the group consisting of kaolin, talc, barytes and titanium dioxide, said pigment containing from 0 to less than 0.1% by weight of phosphate dispersing agents, a binder taken from the group consisting of substituted starch and polyvinyl alcohol, and glyoxal as an insolubilizing agent for the binder, said glyoxal being present in amounts from 2 to 10 parts by weight on an anhydrous basis per 100 parts of binder.

2. A coating composition comprising a water dispersion of 100 parts by weight of a pigment taken from the group consisting of kaolin, talc, barytes and titanium dioxide and containing from 0 to less than 0.1% by weight of phosphate dispersing agents, 10 to 50 parts of a binder taken from the group consisting of substituted starch and polyvinyl alcohol, and from 2 to 10 parts of glyoxal based upon 100 parts of binder, said parts of binder and glyoxal being by weight on an anhydrous basis.

3. A coating composition comprising a water dispersion of 100 parts by weight of kaolin containing from 0 to less than 0.1% by weight of phosphate dispersing agents, 25 parts of hydroxy ethyl starch, and from 1 to 2 parts of glyoxal, said parts of hydroxy ethyl starch and glyoxal being by weight on an anhydrous basis.

4. A coating composition comprising a water dispersion of 100 parts by weight of kaolin, 15 parts of hydroxy ethyl starch, 5 parts of polyvinyl alcohol, and 1.5 parts of glyoxal, said parts of hydroxy ethyl starch and glyoxal being by weight on an anhydrous basis.

5. A web carrying a water resistant pigmented coating consisting essentially of a pigment taken from the group consisting of kaolin, talc, barytes and titanium dioxide and containing from 0 to less than 0.1% by weight of phosphate dispersing agents, a binder for adhering the coating to the paper taken from the group consisting of hydroxy ethyl starch, starch acetate and polyvinyl alcohol, and glyoxal for insolubilizing the binder, said glyoxal being present in amounts from 2 to 10 parts by weight on an anhydrous basis per 100 parts of binder.

6. The article of claim 5 in which the web is paper.

7. A web as in claim 5 wherein said pigment is present in an amount of 100 parts by weight, said binder is taken from the group consisting of substituted starch and polyvinyl alcohol in an amount of from 10 to 50 parts, and said glyoxal is present in an amount of from 2 to 10 parts based on 100 parts of binder, said parts of binder and glyoxal being by weight on an anhydrous basis.

8. The article of claim 7 in which the web is paper.

9. The article of claim 8 in which said coating comprises 100 parts by weight of kaolin as said pigment, said substituted starch is 25 parts of hydroxy ethyl starch, and said glyoxal is present in an amount from 1 to 2 parts based on 100 parts of binder, said parts of hydroxy ethyl starch and glyoxal being by weight on an anhydrous basis.

10. The article of claim 5 in which the web is paper, said coating comprises 100 parts by weight of kaolin as said pigment, said binder is 15 parts of hydroxy ethyl starch and 5 parts of polyvinyl alcohol, and said glyoxal is present as 1.5 parts, said parts of hydroxy ethyl starch and glyoxal being by weight on an anhydrous basis.

References Cited

UNITED STATES PATENTS

| | | | |
|---|---|---|---|
| 2,360,828 | 10/1944 | Craig | 106—154 |
| 2,759,847 | 8/1956 | Frost et al. | 117—156 |
| 2,967,110 | 1/1961 | Beersman et al. | 106—210 |

OTHER REFERENCES

Buttrick and Elored, "Improving the Wet Rub Resistance of Starch-Clay Paper Coatings With Glyoxal," November 1962, pp. 890–893.

Kerr, R. W., "Chemistry and Industry of Starch," 1950, pp. 500–501.

ALEXANDER H. BRODMERKEL, *Primary Examiner.*

T. MORRIS, *Assistant Examiner.*